United States Patent [19]

Müller

[11] Patent Number: 5,365,800
[45] Date of Patent: Nov. 22, 1994

[54] MANUAL TRANSMISSION OF A MOTOR VEHICLE

[75] Inventor: Robert Müller, Mönsheim, Germany

[73] Assignee: Dr. Ing. h.c.F. Porsche AG, Germany

[21] Appl. No.: 22,108

[22] Filed: Feb. 25, 1993

[30] Foreign Application Priority Data

Feb. 25, 1992 [DE] Germany .............. 4205671

[51] Int. Cl.⁵ .............................................. F16H 3/08
[52] U.S. Cl. .............................. 74/333; 74/337.5
[58] Field of Search ........................ 74/333, 337.5

[56] References Cited

U.S. PATENT DOCUMENTS

| | | | |
|---|---|---|---|
| 2,157,249 | 5/1939 | Tenney et al. | 74/333 |
| 2,329,354 | 9/1943 | McCarter | 74/333 |
| 2,518,734 | 8/1950 | Wemp | 74/333 |
| 3,046,807 | 7/1962 | Barth et al. | 74/333 |
| 3,306,545 | 12/1962 | Kümmich | 74/333 |
| 4,038,882 | 8/1977 | Keller | 74/331 |
| 4,574,652 | 3/1986 | Schichinohe et al. | 74/474 |
| 4,635,506 | 1/1987 | Imaizumi et al. | 74/745 |
| 4,713,979 | 12/1987 | Muto et al. | 74/337.5 |
| 4,730,506 | 3/1988 | Kageyama | 74/337.5 |
| 4,879,919 | 11/1989 | Sekizaki | 74/337.5 |

FOREIGN PATENT DOCUMENTS

| | | |
|---|---|---|
| 0179544 | 4/1986 | European Pat. Off. . |
| 2235368 | 10/1973 | Germany . |
| 2445241 | 4/1976 | Germany . |
| 341353 | 2/1978 | Germany . |
| 2008211 | 5/1979 | United Kingdom . |

Primary Examiner—Dirk Wright
Attorney, Agent, or Firm—Evenson, McKeown, Edwards & Lenahan

[57] ABSTRACT

In the case of a synchronized manual transmission of a motor vehicle, the transmission gears, which consist of loose wheels and fixed wheels, can be shifted by means of the coupling of the loose wheels with their pertaining transmission shafts. The transmission gears are arranged such between an input shaft and an output shaft that they can be shifted only by the simultaneous closing of two synchronizer clutches which are assigned to them.

12 Claims, 4 Drawing Sheets

MANUAL TRANSMISSION OF A MOTOR VEHICLE

BACKGROUND AND SUMMARY OF THE INVENTION

This application is related to U.S. Ser. No. 08/022,107 filed on even date herewith.

The present invention relates to a manual transmission of a motor vehicle, comprising a plurality of transmission gears, including forward and reverse gears, which can be shifted with synchronizer clutches.

In the book "Mechanical Transmissions", by Johannes Loomann, Springer-Verlag Berlin, 1998, Page 10, auxiliary transmissions are described which represent a usually two-speed range transmission which is connected in front of or behind the normal manual transmission. These range transmissions have the purpose of increasing the number of gears and the gearing range of the transmission by the multiple use of gearwheel sets. It is stated in this book that, in the case of an interaction with an auxiliary transmission, gearing ratios $p$ in all steps must be approximately identical, in other words, they must form a geometrical row in order to avoid irregularly alternating large and small gearing ratios.

An object of the invention is to provide a manual transmission comprising an auxiliary transmission which, deviating from the geometrical grading, results in a gear grading $p$ which increases in the direction of the lower gears.

This and other objects are achieved by the present invention which provides a manual transmission of a motor vehicle, comprising transmission gears that include a plurality of forward gears and one reverse gear, and synchronizer clutches which shift the gears. All of the transmission gears are arranged such that they can be shifted only by simultaneous closing of two of the synchronizer clutches which are assigned to each gear. The transmission gears are arranged such that a progressive gear grading is provided, with a first range shifting implemented between adjacent transmission gears and a second range shifting implemented between non-adjacent transmission gears.

When a first range shifting is implemented between adjacent gears G1 and G2 and a second range shifting is implemented between the non-adjacent gears G3 and G5, a progressive grading can be achieved which rises in the direction of the lower gears, without the occurrence of irregularly alternating gearing ratios. This progressive grading is desirable in order to achieve a larger spread in the lower gears.

Another important advantage is obtained when, according to an embodiment of the invention, a synchronizer clutch participates in the shifting of all transmission gears. The reason is that, in this case, by means of the uncoupling of the shift rod, which actuates the synchronizer clutch, from an actuating roller, a shifting into idling can take place from any shifted transmission gear. When a roller shifting system is used that is known particularly in the case of motorcycles, not all of the gears must then be shifted through successively in order to arrive in idling, but the idling position can be reached by means of a one-time shifting. Inversely, a shifting into any gear can take place directly from the idling position.

When the gear ratios are selected according to certain embodiments of the invention, a progressive transmission grading and a desired higher spread of the lower transmission gears can be achieved than is possible in the case of the conventional geometrical grading.

DETAILED DESCRIPTION OF THE DRAWINGS

Figure 1:
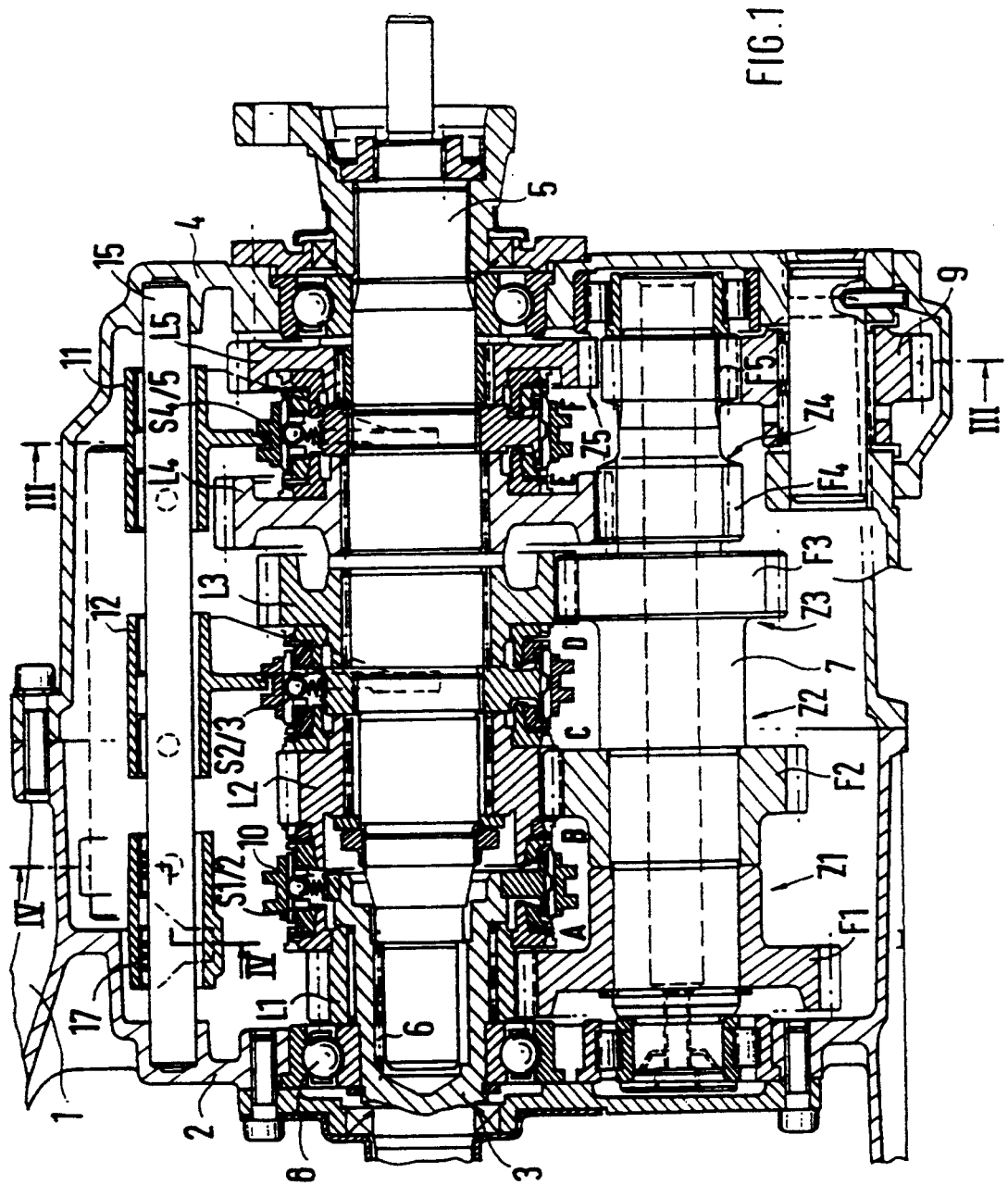
FIG. 1 is a longitudinal sectional view of a manual transmission constructed in accordance with an embodiment of the present invention.

A manual transmission of a motor vehicle comprising six forward gears and one reverse gear is enclosed by a transmission casing 1. An input shaft 3 is disposed in one end face wall 2 of the transmission casing and an output shaft 5 is disposed in the other end face wall 4. On its other side, the output shaft 5 is disposed close to the end face wall 2 in a needle bearing 6 centrically in the hollow-drilled input shaft 3. In parallel to the input shaft 3 and the output shaft 5, an auxiliary shaft 7 is disposed in the transmission casing i on which all fixed wheels F are disposed of the gearwheel pairs Z1, Z2, Z3, Z4 and Z5 which each consist of one loose wheel L and one fixed wheel F.

The loose wheel L1 of Z1 is disposed on the input shaft 3 and is axially supported on the ball bearing 8 of the input shaft 3. The other loose wheels L2, L3, L4, L5 are disposed on the output shaft 5 and mesh with the fixed wheels F2, F3, F4, F5, in which case the loose wheel L5 for the reverse gear R engages via an idler 9 with the fixed wheel F5 in order to obtain a reversal of movement. The loose wheels L2, L3, L4, L5 can be coupled with the output shaft 5 by means of commercially available, identically constructed synchronizer clutches known to one of ordinary skill in the art, and the loose wheel L1 can be coupled with the input shaft 3.

In the left closing position A of a synchronizer clutch S 1/2, the gearwheel pair Z1 is coupled with the synchronizer clutch S ½ and in the right closing position B, the gearwheel pair Z2 is coupled with the synchronizer clutch S 1/2. A synchronizer clutch S 2/3 couples the gearwheel pair Z2 in the closing position C, and in the closing position D, the gearwheel pair Z3. Another synchronizer clutch S 4/5 couples the gearwheel pair Z4 in the closing position E, and the gear wheel pair Z5 of the reverse gear in the closing position F. In order to shift one of the transmission gears G1, G2, G3, G4, G5, G6 or R, two synchronizer clutches respectively are brought into the closing position. The following table indicates which closing position is implemented for the shifting of the transmission gears. The table also contains the gear ratios i and the step ratios, $p$ in the manner of examples. The overall spread $p$ of the gear ratios of the manual transmission is 5.2.

| S.M | A | B | C | D | E | F | Ratio |
|---|---|---|---|---|---|---|---|
| R | X | | | | | X | i |
| | | | | | | | $\phi$ |
| G1. | X | | | | X | | 5.20 |
| | | | | | | | 1.65 |

-continued

| S.M | A | B | C | D | E | F | Ratio |
|-----|---|---|---|---|---|---|-------|
| G2. |   | X |   | X |   |   | 3.152 |
|     |   |   |   |   |   |   | 1.492 |
| G3. | X |   | X |   |   |   | 2.112 |
|     |   |   |   |   |   |   | 1.28  |
| G4. | X |   | X |   |   |   | 1.65  |
|     |   |   |   |   |   |   | 1.29  |
| G5. |   | X |   | X |   |   | 1.28  |
|     |   |   |   |   |   |   | 1.28  |
| G6. |   | X | X |   |   |   | 1.00  |

For the shifting of the five lower transmission gears G1 to G5 and of the reverse gear R, two gearwheel pairs respectively are required. For the shifting of the 6th gear G6, the loose wheel L2 is connected by the synchronizer clutch S 1/2 in its closing position B with the input shaft 3 and by the synchronizer clutch S 2/3 in its closing position C with the output shaft 5 so that a direct throughdrive takes place without any change of ratio from the input shaft 3 to the output shaft 5. The other ratios i1 to i5 are selected such that the gears G1 and G2 have a desired higher spread than is possible in the case of a geometric grading with a constant step ratio $\rho$. The progressive gear grading is made possible by the fact that a first range shifting is implemented between the gears G1 and G2, and a second range shifting is implemented between the non-adjacent gears G3 and G5.

Figure 2:
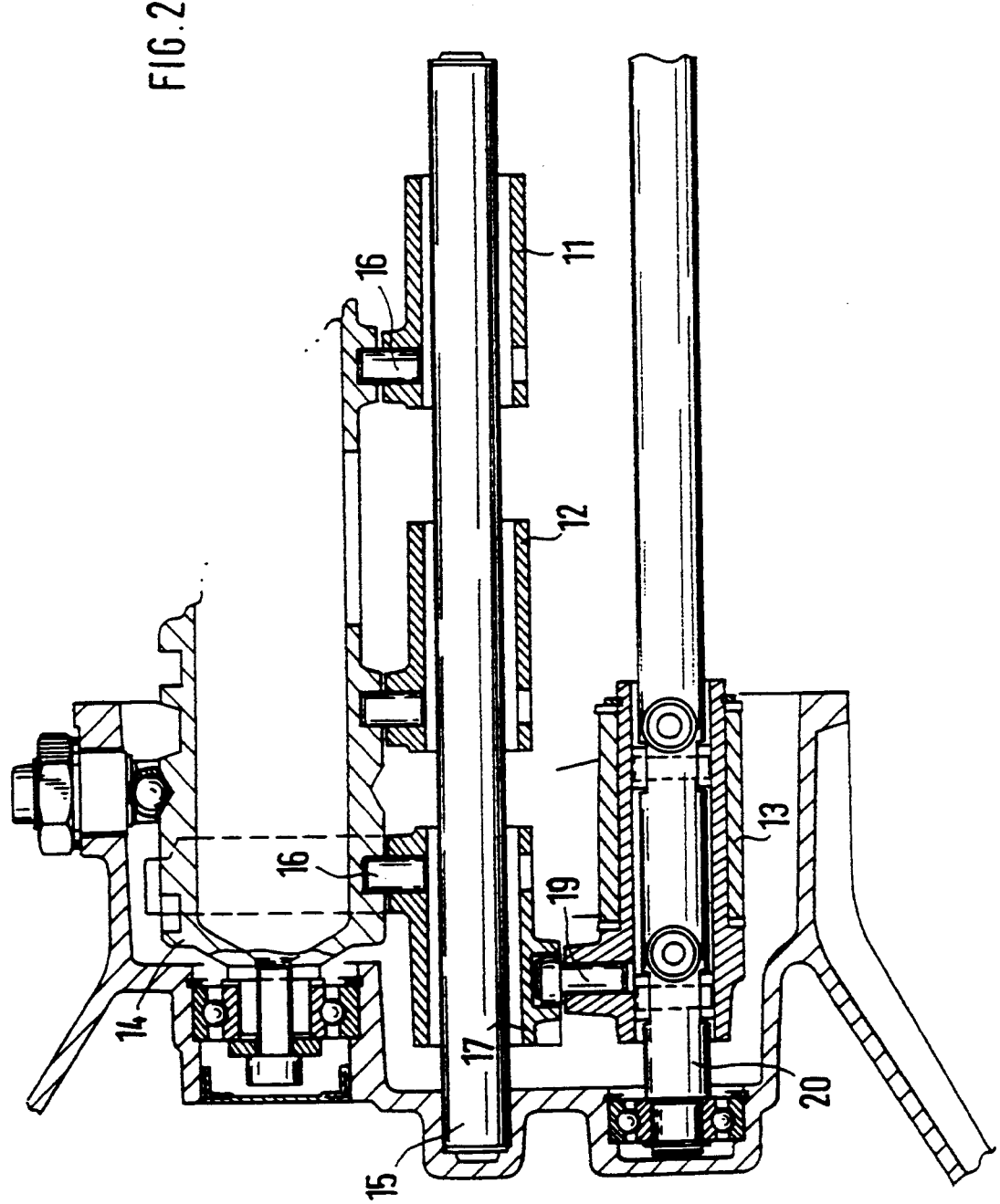
FIG. 2 is a longitudinal sectional view according to Line II—II of FIG. 4.
Figure 3:
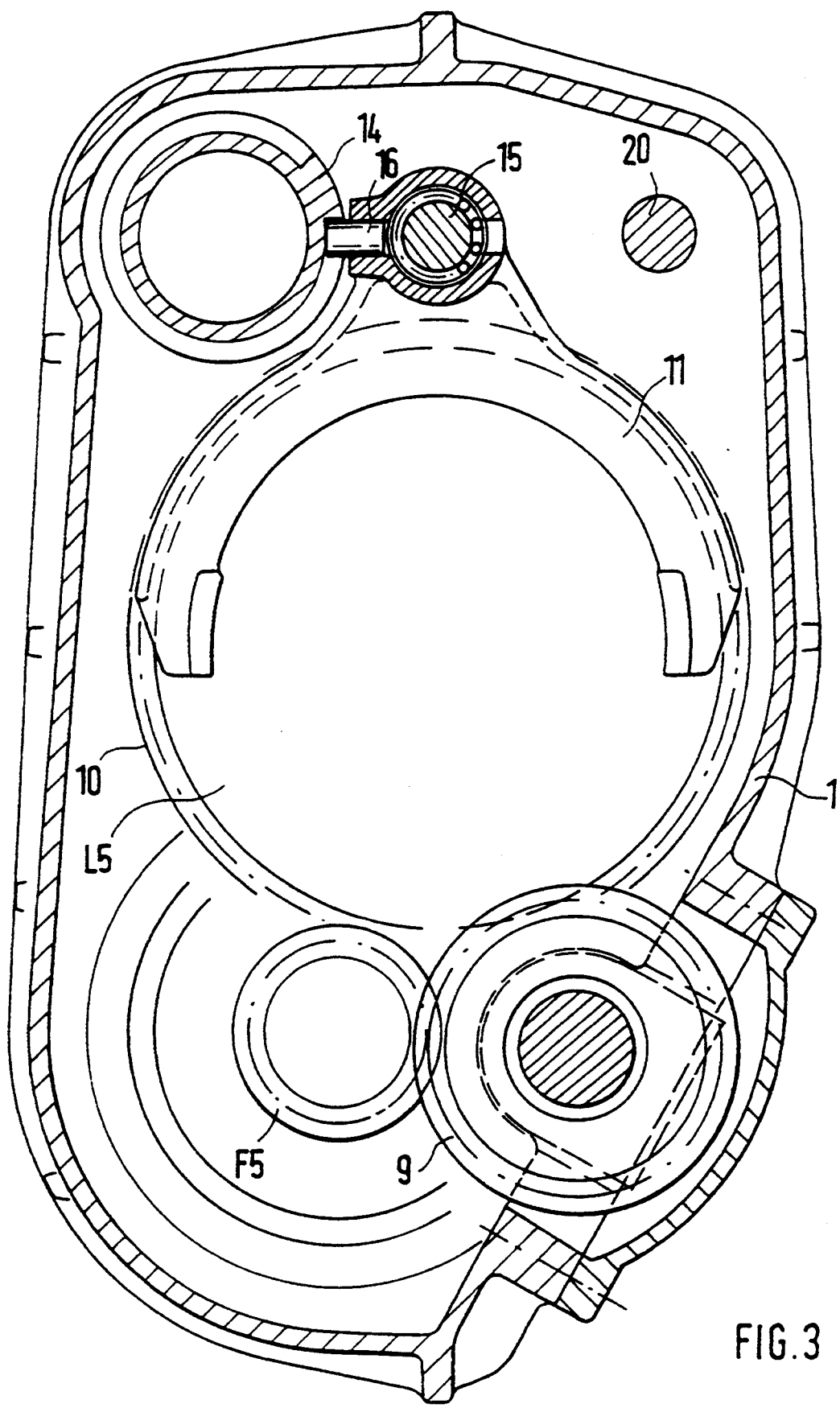
FIG. 3 is a cross-sectional view according to Line III—III of FIG. 1.
Figure 4:
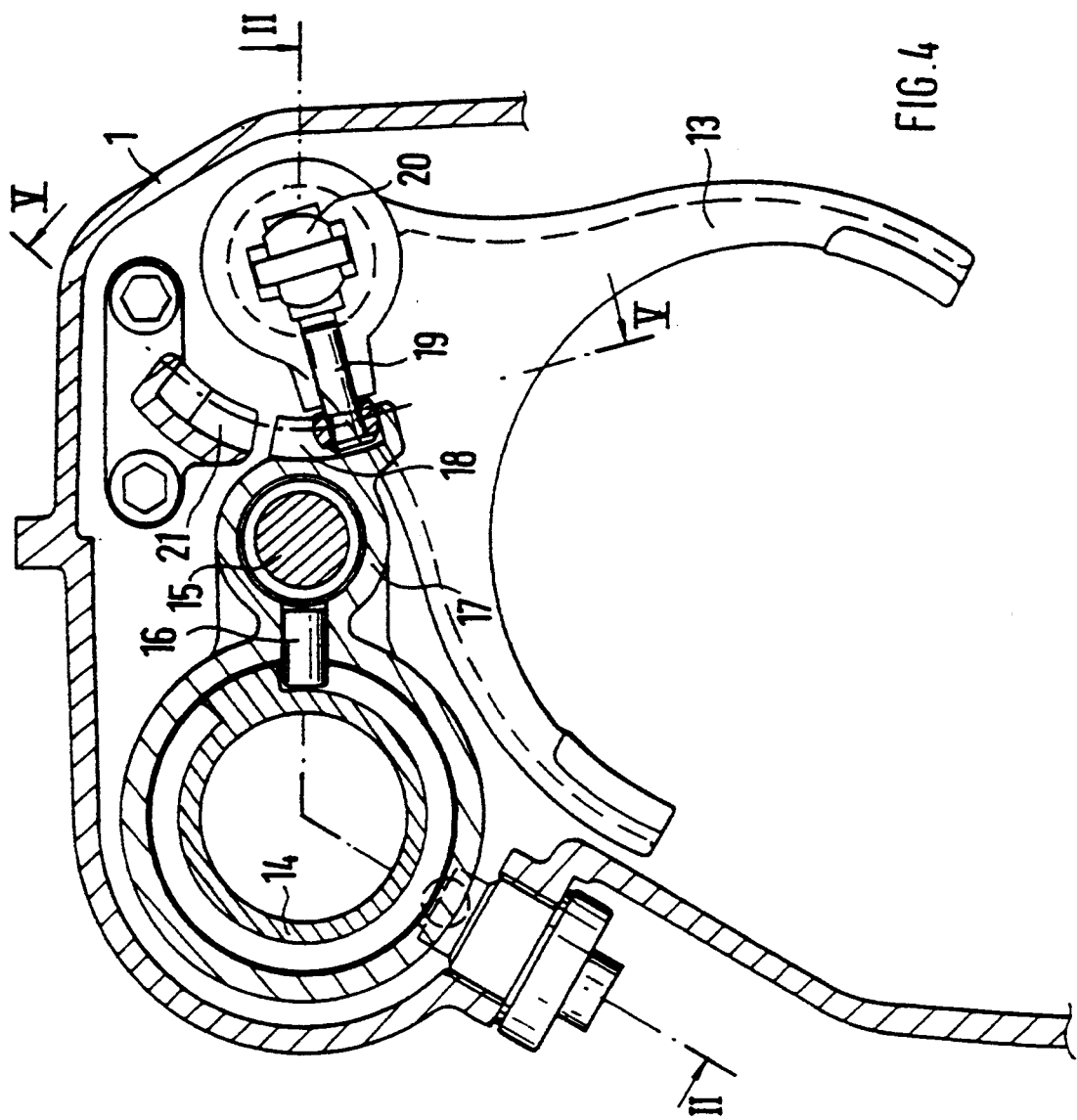
FIG. 4 is a cross-sectional view according to Line IV—IV of FIG. 1.
Figure 5:
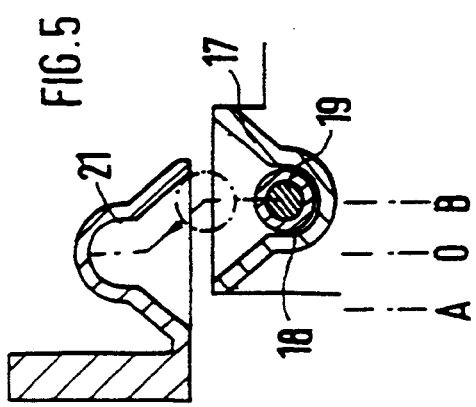
FIG. 5 is a developed view in plane V—V of FIG. 4.

In order to be able to bring the synchronizer clutches into the closing position, the shift forks 11, 12, 13, which are actuated by a shift roller 14, engage in the sliding sleeves 10 of the synchronizer clutches. The shift roller 14 is constructed in a conventional manner and causes, by means of curved paths, an axial shifting of the shift forks 11, 12, 13. The shift forks 11, 12 are longitudinally slidably and rotatably disposed on a shaft 15 fixed to the casing, and can be shifted directly by the shift roller 14 by way of pins 16 (FIG. 2). On the shaft 15, a driving device 17 is also disposed and can be actuated by the shift roller 14 by way of a pin 16. A coupling finger 19 engages in a circular groove 18 of the driving device 17 (FIG. 4). The coupling finger 19 is fastened on a shaft 20 on which the shift rod 13 is disposed.

When the synchronizer clutch S 1/2 is to be brought into its center neutral position in order to shift the transmission into idling, the coupling finger 19 is swivelled out of the groove 18 and is swivelled into a curved guide 21 fixed to the housing.

The constructed manual transmission requires four gearwheel pairs for six forward gears. The transmission can be expanded arbitrarily, in which case, by means of the addition of another gearwheel pair, two additional transmission gears can be shown.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A manual transmission of a motor vehicle, comprising:
   transmission gears that include a plurality of forward gears and one reverse gear;
   synchronizer clutches which shift the gears, with all said transmission gears being arranged such that they can be shifted only by simultaneous closing of two of said synchronizer clutches which are assigned to each gear;
   wherein the transmission gears are arranged such that a progressive gear grading is provided, with a first range shifting implemented between adjacent transmission gears and a second range shifting implemented between non-adjacent transmission gears.

2. A manual transmission according to claim 1, further comprising an input shaft, an output shaft which is disposed coaxially to the input shaft, and an auxiliary shaft situated in parallel to the output shaft, wherein the transmission gears include gearwheel pairs arranged between the input shaft, the output shaft and the auxiliary shaft, each gearwheel pair including a loose wheel and a fixed wheel, with all of the fixed wheels being coupled to the auxiliary shaft.

3. A manual transmission according to claim 2, wherein a first one of said loose wheels and the synchronizer clutch assigned to the first loose wheel are arranged on the input shaft, and all other loose wheels and synchronizer clutches are arranged on the output shaft.

4. A manual transmission according to claim 1, each transmission gear is formed of two gearwheel pairs, the loose wheel of the one gearwheel pair being connectable with the input shaft, the loose wheel of the other gearwheel pair being connected with the output shaft via said synchronizer clutches.

5. A manual transmission according to claim 1, wherein the transmission gears includes gearwheel pairs with a loose wheel and a fixed wheel, with the loose wheel of one of said gear wheel pairs being connectable with an input shaft by a first one of said synchronizer clutch, and of said connectable with an output shaft by a second synchronizer clutches acting on opposite end faces of the loose wheel to thereby shift a highest transmission gear.

6. A manual transmission according to claim 2, further comprising a casing for housing the transmission, wherein the output shaft is disposed centrically in the input shaft, and wherein the input shaft is disposed on a first end wall of the transmission casing, and the output shaft is disposed on a second other end wall of the casing.

7. A manual transmission according to claim 1, wherein four gearwheel pairs and three synchronizer clutches are provided for a 6-gear transmission with an R-gear.

8. A manual transmission according to claim 3, wherein one of said synchronizer clutches is arranged so as to participate in shifting of all of said transmission gears, in that, when one of said transmission gears is shifted, the said synchronizer clutch is either in a first closing position or in a second closing position, and, in a neutral center position, the said synchronizer clutch causes the transmission to be in an idling position.

9. A manual transmission according to claim 1, further comprising shift forks which are actuatable by a shift roller 14 to engage in the synchronizer clutches.

10. A manual transmission according to claim 9, wherein one of said shift forks is actuatable by the shift roller via a driving device and a coupling finger, said coupling finger being selectively disengageable from the driving device.

11. A manual transmission according to claim 1, wherein six forward gears of gear ratios are provided and wherein a progressive gear grading is implemented, the following relationship being applied:

$$\frac{i1}{i2} = \frac{i3}{i5} = \frac{i4}{i6} = \frac{i3}{i4} \cdot \frac{i4}{i5}$$

wherein i1 to i6 represent forward gear ratios.

12. A manual transmission according to claim 1, wherein a size of step ratios rises continuously in the direction of the lower transmission gears.

* * * * *